United States Patent
Gooneratne et al.

(10) Patent No.: US 10,844,694 B2
(45) Date of Patent: **\*Nov. 24, 2020**

(54) SELF-POWERED MINIATURE MOBILE SENSING DEVICE

(71) Applicant: Saudi Arabian Oil Company, Dhahran (SA)

(72) Inventors: Chinthaka Pasan Gooneratne, Dhahran (SA); Bodong Li, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/202,324

(22) Filed: Nov. 28, 2018

(65) Prior Publication Data
US 2020/0165905 A1 May 28, 2020

(51) Int. Cl.
| | |
|---|---|
| *E21B 41/00* | (2006.01) |
| *H02N 1/04* | (2006.01) |
| *H02N 2/18* | (2006.01) |
| *H01L 41/113* | (2006.01) |
| *E21B 47/13* | (2012.01) |
| *E21B 47/00* | (2012.01) |
| *E21B 49/00* | (2006.01) |

(52) U.S. Cl.
CPC .......... *E21B 41/0085* (2013.01); *E21B 47/00* (2013.01); *E21B 47/13* (2020.05); *E21B 49/00* (2013.01); *H02N 1/04* (2013.01)

(58) Field of Classification Search
None
See application file for complete search history.

(56) References Cited

U.S. PATENT DOCUMENTS

| | | |
|---|---|---|
| 4,597,067 A | 6/1986 | Bockhorst et al. |
| 5,839,508 A | 11/1998 | Tubel et al. |
| 6,324,904 B1 | 12/2001 | Ishikawa et al. |
| | (Continued) | |

FOREIGN PATENT DOCUMENTS

| | | |
|---|---|---|
| GB | 2419362 A | 4/2006 |
| WO | WO2016185235 A1 | 11/2016 |

OTHER PUBLICATIONS

International Search Report and Written Opinion for International Application No. PCT/US2018/022107 (SA5620); International Filing Date Mar. 13, 2018; Report dated Jun. 20, 2018 (pp. 1-13).

(Continued)

*Primary Examiner* — Curtis A Kuntz
*Assistant Examiner* — Jerold B Murphy
(74) *Attorney, Agent, or Firm* — Bracewell LLP; Constance G. Rhebergen; Vivek P. Shankam

(57) ABSTRACT

A device for wirelessly monitoring well conditions includes a power including a first material attached to edges of at least one lever suspended about a central fulcrum, wherein the edges of the at least one lever are free to move about the central fulcrum, a frictionless movable object disposed inside the body of the at least one lever, wherein the frictionless movable object is free to move within the body of the at least one lever, and a second material that is fixed in position relative to the first material, wherein the first material and second material are of opposite polarities.

31 Claims, 11 Drawing Sheets

(56) References Cited

U.S. PATENT DOCUMENTS

| | | |
|---|---|---|
| 6,691,802 B2 | 2/2004 | Schultz et al. |
| 6,745,833 B2 | 6/2004 | Aronstam et al. |
| 6,976,535 B2 | 12/2005 | Aronstam et al. |
| 7,165,608 B2 | 1/2007 | Schultz et al. |
| 7,190,084 B2 | 3/2007 | Hall et al. |
| 7,714,741 B2 | 5/2010 | Snider et al. |
| 7,729,860 B2 | 6/2010 | Pabon et al. |
| 7,849,919 B2 | 12/2010 | Wood et al. |
| 8,179,278 B2 | 5/2012 | Shakra et al. |
| 8,511,373 B2 | 8/2013 | Tosi et al. |
| 8,581,427 B2 | 11/2013 | Schoonover |
| 8,604,634 B2 | 12/2013 | Pabon et al. |
| 8,714,239 B2 | 5/2014 | Tosi et al. |
| 8,847,468 B2 * | 9/2014 | Suzuki ............... H02N 2/188 310/339 |
| 9,063,252 B2 | 6/2015 | Kamal et al. |
| 9,091,145 B2 | 7/2015 | Colvin et al. |
| 9,115,573 B2 | 8/2015 | Purkis et al. |
| 9,181,797 B2 | 11/2015 | Zientarski |
| 9,284,834 B2 | 3/2016 | Alteirac et al. |
| 9,359,841 B2 | 6/2016 | Hall |
| 9,366,134 B2 | 6/2016 | Walton et al. |
| 9,429,559 B2 | 8/2016 | Radjy |
| 9,453,410 B2 | 9/2016 | Logan et al. |
| 9,732,879 B2 | 8/2017 | Jaffrey |
| 9,822,631 B2 | 11/2017 | Ravi et al. |
| 9,843,248 B2 * | 12/2017 | Deak, Sr. ............... H02K 35/02 |
| 9,879,519 B2 | 1/2018 | Roberson et al. |
| 10,072,495 B1 | 9/2018 | Gooneratne et al. |
| 10,320,311 B2 | 6/2019 | Gooneratne et al. |
| 2001/0054969 A1 | 12/2001 | Thomeer et al. |
| 2006/0016606 A1 | 1/2006 | Tubel et al. |
| 2006/0064826 A1 | 3/2006 | Kimball |
| 2008/0007421 A1 | 1/2008 | Liu et al. |
| 2008/0257546 A1 | 10/2008 | Cresswell et al. |
| 2008/0265712 A1 | 10/2008 | Ulm et al. |
| 2009/0038848 A1 | 2/2009 | Garcia-Osuna |
| 2009/0101329 A1 | 4/2009 | Clem et al. |
| 2009/0166045 A1 | 7/2009 | Wetzel et al. |
| 2009/0271117 A1 | 10/2009 | Ayoub et al. |
| 2010/0133006 A1 * | 6/2010 | Shakra ............... E21B 47/12 175/24 |
| 2011/0050181 A1 | 3/2011 | Post et al. |
| 2011/0169276 A1 | 7/2011 | Akamatsu |
| 2011/0210645 A1 | 9/2011 | Mason |
| 2012/0032560 A1 | 2/2012 | Ochoa et al. |
| 2012/0146806 A1 | 6/2012 | Purkis |
| 2013/0076202 A1 * | 3/2013 | Naito ............... H02N 1/04 310/300 |
| 2013/0118733 A1 | 5/2013 | Kumar |
| 2013/0155631 A1 | 6/2013 | Yamauchi et al. |
| 2014/0069639 A1 | 3/2014 | Mackenzie et al. |
| 2014/0084748 A1 | 3/2014 | Wang et al. |
| 2014/0210307 A1 | 7/2014 | Tosi et al. |
| 2014/0246950 A1 | 9/2014 | Wang et al. |
| 2014/0265580 A1 | 9/2014 | Cooley et al. |
| 2014/0292138 A1 | 10/2014 | Wang et al. |
| 2014/0300248 A1 | 10/2014 | Wang et al. |
| 2014/0338458 A1 | 11/2014 | Wang et al. |
| 2015/0115748 A1 | 4/2015 | Shimanouchi et al. |
| 2015/0135869 A1 * | 5/2015 | Jia ............... H01L 41/1136 74/96 |
| 2015/0218885 A1 | 8/2015 | Sitka |
| 2015/0330212 A1 | 11/2015 | Sassi et al. |
| 2016/0010427 A1 | 1/2016 | Kelbie et al. |
| 2016/0252071 A1 | 9/2016 | Phillips et al. |
| 2017/0346416 A1 | 11/2017 | Rutgers et al. |
| 2019/0273973 A1 * | 9/2019 | Sassi ............... E21B 47/13 |

OTHER PUBLICATIONS

International Search Report and Written Opinion for International Application No. PCT/US2018/022099 (SA5622); International Filing Date Mar. 13, 2018; Report dated Jun. 20, 2018 (pp. 1-13).

* cited by examiner

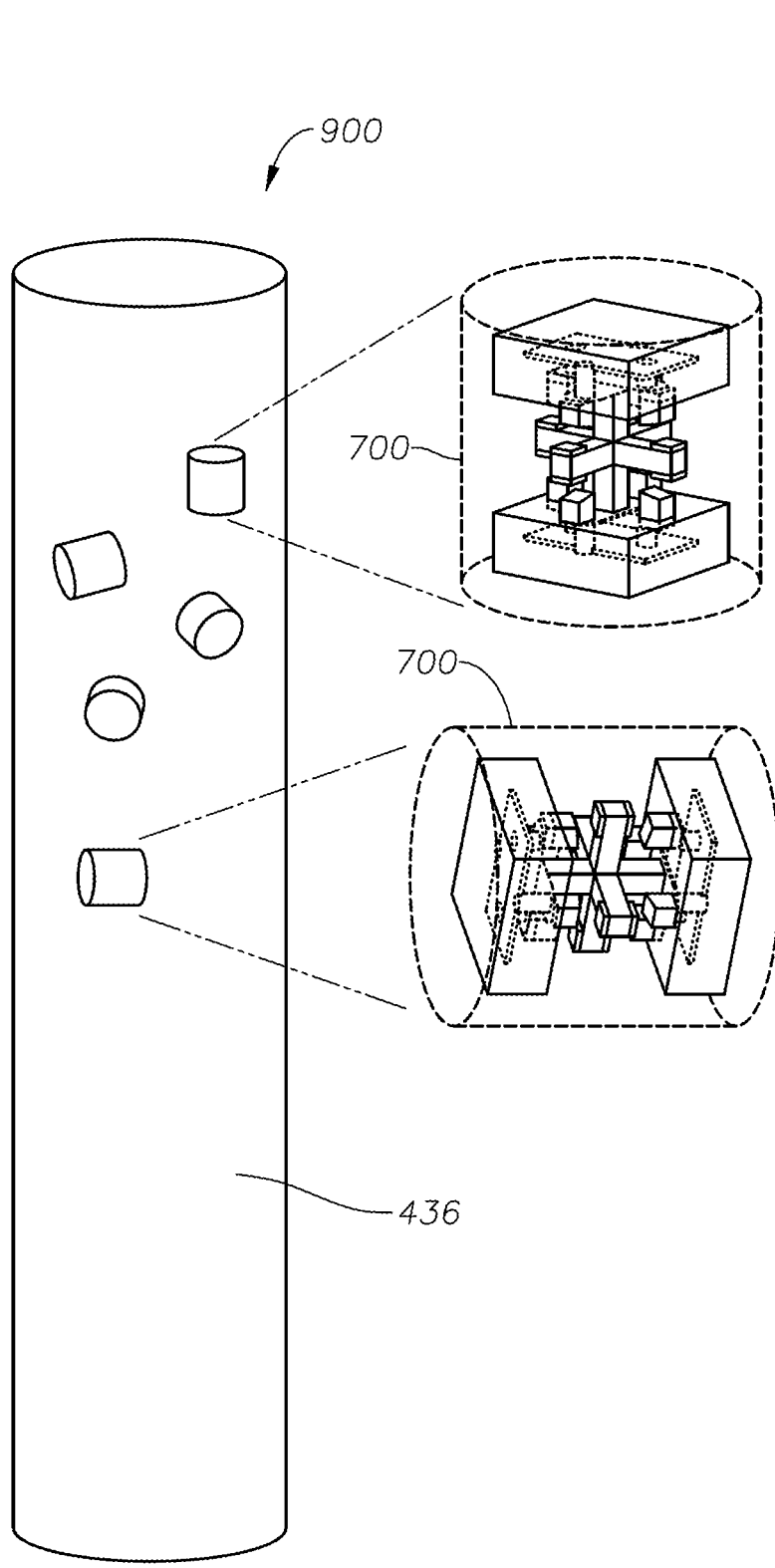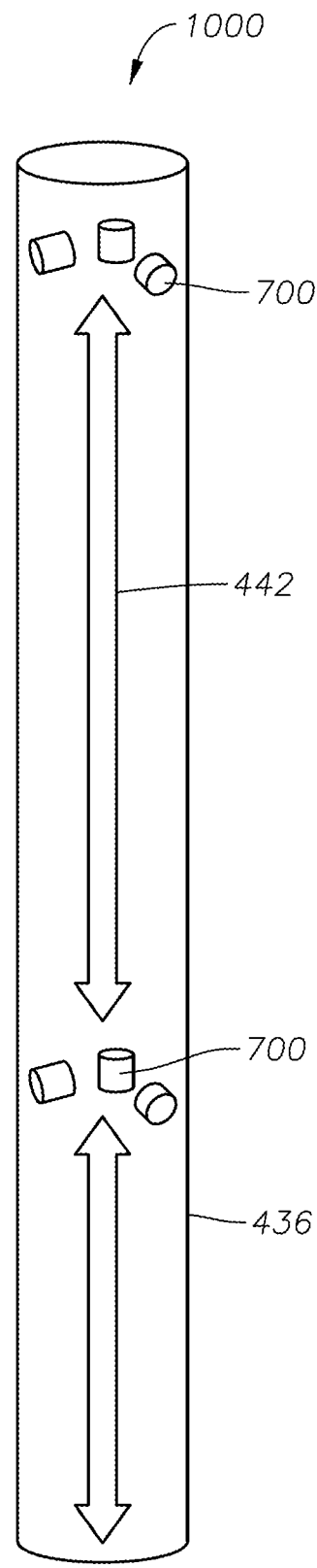
FIG. 9
FIG. 10

SELF-POWERED MINIATURE MOBILE SENSING DEVICE

BACKGROUND

1. Field

Embodiments of the present disclosure relate to systems and methods for wirelessly monitoring well conditions using high temperature, self-powered, miniature mobile sensing devices including a power generator that generates power based on friction, generated by fluid or mud flow, between two materials of opposite polarity.

2. Description of Related Art

Logging tools, such as wireline logging tools, MWD (measurement while drilling) and LWD (logging while drilling) are used to obtain information about the geological formations both inside and surrounding limited wellbore regions. The information obtained by these downhole measurement tools can be used to make various interpretations about the formations and conditions inside a well, which can then be used to make and revise drilling programs. Wireline and MWD/LWD tools have the ability to measure, either directly or indirectly, a wide range of measurements such as wellbore trajectory, and formation characteristics including resistivity, density, porosity, lithology, mineralogy, geological structure, permeability as well as geomechanical and fluid properties. Wireline tools have been used for many decades to obtain downhole wellbore and formation data.

In a wireline logging operation, a tool which contains several sensors are lowered into a well and data is obtained at various points inside a well until the tool reaches the bottom. Data is also obtained when the wireline tool is pulled out of the well. If the wireline logging tool is to be run for example after drilling an open hole, first, the drilling assembly has to be pulled out of hole. Then, the wireline operation also takes time, depending on the well depth and resolution of the data, to be run in the hole. Once the wireline logging is finished it has to be pulled out of the hole and the drilling assembly has to be run in hole again. Wireline logging is expensive due to the time spent on performing a wireline logging operation as well as the expensive sensors and packaging. During wireline operation, fluid in the wellbore typically remains static and the wellbore condition has to be in a favorable condition, if several logging runs are required, a dedicated wiper trip is required in between logging runs. Moreover, there is always the risk of a wireline logging tool getting stuck in the hole, which could significantly add to the cost of drilling a well.

MWD/LWD tools, as the names suggest, obtain measurements while drilling in real-time. MWD tools are especially important when drilling directional wells since they give the driller information about the trajectory of the well along with information such as tool downhole vibration, and gamma ray tool internal temperature. LWD tools on the other hand obtain information about the geological properties of the well and can be added to a bottom hole assembly depending on the formation evaluation requirements, such as resistivity, density etc. for the primary purpose identifying potential hydrocarbon bearing zone. The signals from the MWD/LWD tools are communicated to the surface by mud pulse telemetry and are recorded at the surface by pressure transducers, which are decoded immediately. MWD/LWD are very expensive, bulky and lengthy tools and mud pulse rate is generally slow (maximum of up to 20 bits/second in the field). The power to the MWD/LWD tools and the mud pulse telemetry unit is provided by batteries and recently by a downhole turbine/alternator. The power generation turbine, if installed close to the mud pulser and above the LWD tool, may prevent the retrieval of radioactive chemical sources in the LWD tool if the drilling bottom-hole assembly gets stuck and cannot be retrieved. It should be pointed out that the MWD/LWD tools are typically placed 35-60 feet away from the drill bit. Therefore, the driller does not have any information about the downhole environment at the bit.

Near-bit tools have gamma ray and inclination sensors 3-10 feet away from the bit but the number of sensors that can be placed near a bit is limited and the sensors are exposed extremely harsh environment, which may affect its performance and lifespan compared to sensor modules located further above the bit. If the drilling assembly contains a mud motor above the near-bit tools, additional data transmission means (data hoop from sensors to mud pulser) are needed to ensure real-time data transmission to surface, which adds considerable technical complexities and therefore prone to problems while operating the tools.

SUMMARY

Accordingly, example embodiments relate to a smart, miniature mobile sensing device with integrated sensors and a communication module that can be injected into wells to evaluate, characterize downhole in-situ environments as well as carry commanding signals to downhole equipment. The present disclosure illustrates how miniature mobile sensing devices (MMSDs) provide clear advantages over current technologies such as wireline and MWD/LWD with respect to size, cost, sensitivity, power, mobility and potentially more downhole applications. Since the components are very small they require less power to operate, a significant advantage in downhole environments. A power generator based on in-situ downhole energy harvesting is designed to meet the lower power requirement of the MMSDs. Batteries can also be used to provide power to the MMSDs but batteries are not easily replicable and generally cease to function at high temperatures (>125° C.). The MMSD is self-powered since both mechanical and hydraulic energies are harvested when a MMSD flows with the wellbore fluid and this energy can be used to power the sensors, actuators and a communication module. The present disclosure provides several applications of these MMSDs such as sensing, actuating, monitoring as well as transmitting and receiving data in a downhole environment.

One example embodiment is a smart, self-powered miniature mobile sensing device (MMSD) with a power generator, integrated sensors and a communication module that can be dropped/injected into wells from the surface to evaluate, characterize downhole in-situ environments as well as carry commanding signals to downhole equipment to activate/configure them as well as read data from them. The mobile sensing devices have the possibility to get as close as possible to the geological formations to measure data since they travel with the mud, down through the drill string, out of the nozzles and back up the annulus, providing a complete profile of the wellbore. Moreover, by sending several mobile sensing devices downhole we can obtain high resolution/spatial data. The mobile sensing devices can not only be released from the surface but also be released from any depth of the well or flow from the annulus, through the drill string to the surface by reversing the flow. These MMSDs have the ability to perform the same/similar functions as wireline logging and MWD/LWD tools but are smaller, more flexible, and more economical. Since the components are very small they require less power to operate, a significant advantage in downhole environments. A power generator based on energy harvesting is designed to meet the lower power requirement of the MMSDs. Batteries can also be used to provide power to the MMSDs but batteries are not easily replicable and cease to function at high temperatures. The MMSD can be self-powered since both mechanical and hydraulic energies are harvested when a MMSD flows with the mud and this energy can be used to power sensors, actuators and a communication module.

One example embodiment is a device for wirelessly monitoring well conditions. The device includes a power generator including a first material attached to edges of at least one lever suspended about a central fulcrum, wherein the edges of the at least one lever are free to move about the central fulcrum, a frictionless movable object disposed inside the body of the at least one lever, wherein the frictionless movable object is free to move within the body of the at least one lever, and a second material that is fixed in position relative to the first material, wherein the first material and second material are of opposite polarities. The device also includes at least one electrode that is connected to the first material or second material, a bridge rectifier connected to the at least one electrode to transform the power generated into direct current from alternating current, a storage unit for storing the power generated by the power generator, at least one sensor that gathers information concerning a downhole environment, and a microcontroller and transceiver unit to manage the power generated by the power generator and transmit information gathered by the at least one sensor, wherein the at least one sensor is operatively coupled to the microcontroller.

The system may also include a shell to house and protect the power generator, sensors, microcontroller/microprocessor and communication module of the MMSD. The transceiver unit in the communications module may be configured to communicate over a wireless communication method selected from the group consisting of Wi-Fi, Wi-Fi Direct, Bluetooth, Bluetooth Low Energy, and ZigBee. The shell can be designed from a polymer material such as elastomer, which is already used in downhole tools. Packaging and encapsulation is mainly done to protect the MMSD components from mud and other fluids in the formation, which may degrade its performance. However, it is important that the packaging and encapsulation does not in any way diminish the energies being harvested. The packaging and encapsulation should maintain or amplify the energies being harvested. In order to minimize vibrations in the sensors, electronics and the communication module they can be mounted and installed in ways to isolate vibrations. Chemical coatings can be used to further protect the MMSD and its components from the harsh downhole environment. They can be polymeric coatings, which can be used to provide a uniform and pinhole free layer on sensor and electronic boards. These coatings can withstand continuous exposure to high temperatures for long periods of time, prevents corrosion of electrodes and is an excellent dielectric. Thermal insulation significantly extends the life and durability of the sensors and electronics. The outer protective shell shields all the components inside from the environment and can be epoxy, resin-based materials, or any material that has good thermal conductivity properties.

The system may also include one or more downhole tools placed along a drill string inside a well that can be activated, deactivated, or configured by the high temperature miniature mobile sensing device when the device is within a predetermined distance from the tool. A unique feature of this system is that a mobile sensing device doesn't necessarily have to reach a bottomhole tool to activate/configure it. A signal can be simply sent along the transceiver channel from any depth to the bottomhole tool to activate/configure it. If the activation/configuration depends on the values of certain wellbore parameters at a certain depth, then the mobile sensing device can flow to this depth, measure these parameters and send a signal based on the result to the downhole tool via the transceiver channel. The downhole tool can also be used for activating, deactivating, or configuring the high temperature miniature mobile sensing device when the device is within a predetermined distance from the tool.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

FIG. 9 is a schematic of a system including a high temperature downhole miniature mobile sensing devices, comprising a high temperature downhole power generator, sensors, microcontroller/microprocessor and a communications module, embedded in a drill pipe, according to one or more example embodiments.

FIG. 10 is a schematic of a system including a high temperature downhole miniature mobile sensing devices, comprising a high temperature downhole power generator, sensors, microcontroller/microprocessor and a communications module, embedded in a drill pipe, which can be repeated along a drill string assembly for two way data communication, according to one or more example embodiments.

DETAILED DESCRIPTION

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. The term "high temperature" as referred to herein refers to temperatures above 125° C. unless otherwise noted.

Figure 1:
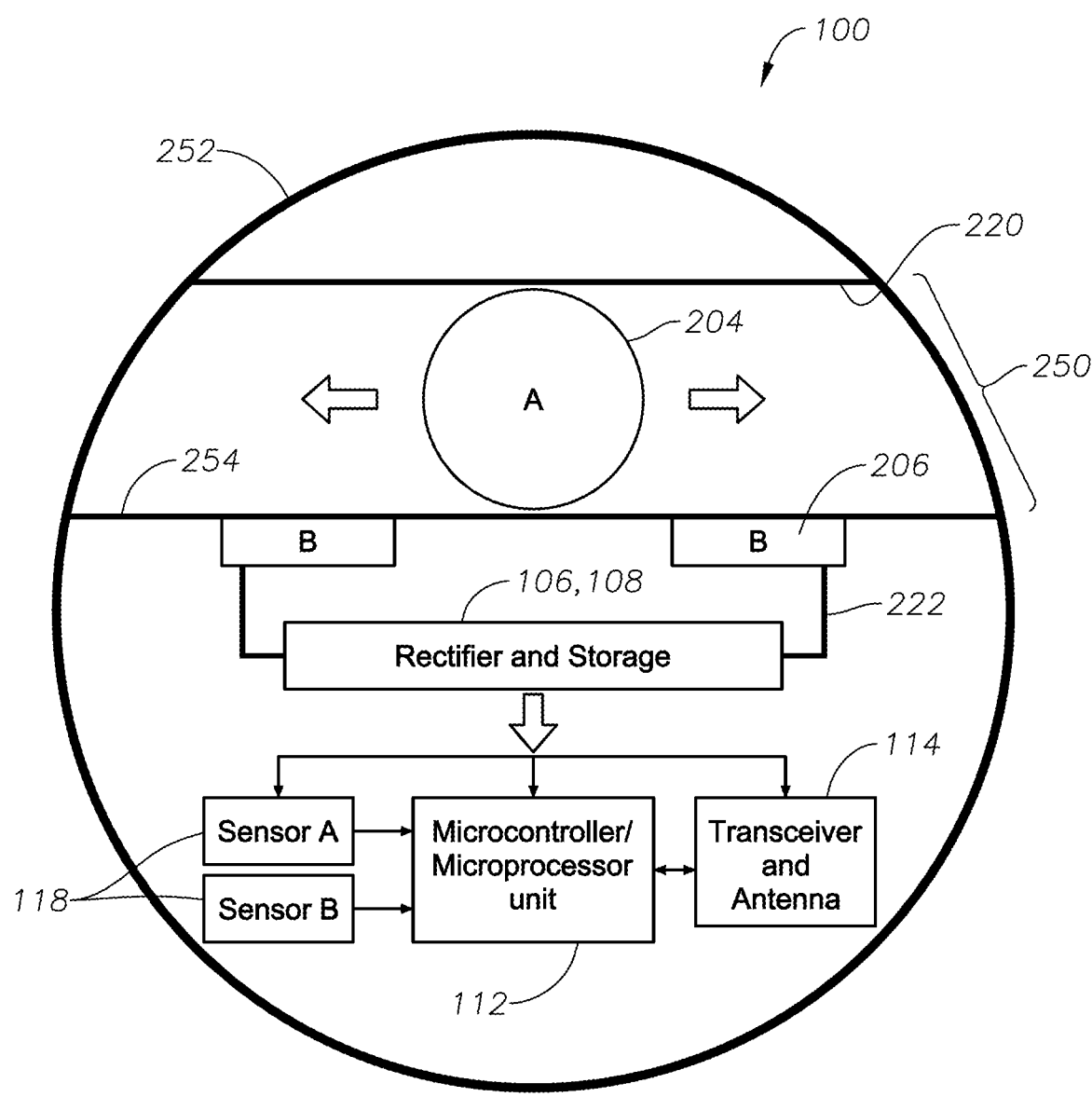
FIG. 1 is a schematic of a high temperature downhole miniature mobile sensing device comprising a high temperature downhole power generator, sensors, microcontroller/microprocessor and a communications module, according to one or more example embodiments.

Turning now to the figures, FIG. 1 illustrates a smart miniature mobile sensing device (MMSD) 100 with a power generator 250, integrated sensors 118, microcontroller/microprocessor 112 and a communication module 114 that can be injected into wells to evaluate, characterize downhole environments as well as control downhole equipment. These MMSDs have the ability to perform the same/similar functions as wireline logging and MWD/LWD tools but are smaller, more flexible, and more economical. Since the components are very small they require less power to operate, a significant advantage in downhole environments. A power generator based 250 on energy harvesting is designed to meet the lower power requirement of the MMSDs. Batteries can also be used to provide power to the MMSDs but batteries are not easily replicable and cease to function at high temperatures. The MMSD 100 is self-powered since both mechanical and hydraulic energies are harvested when a MMSD flows with the mud and this energy can be used to power the sensors 118, microcontroller/microprocessor 112, and a communication module 114.

Figure 2:
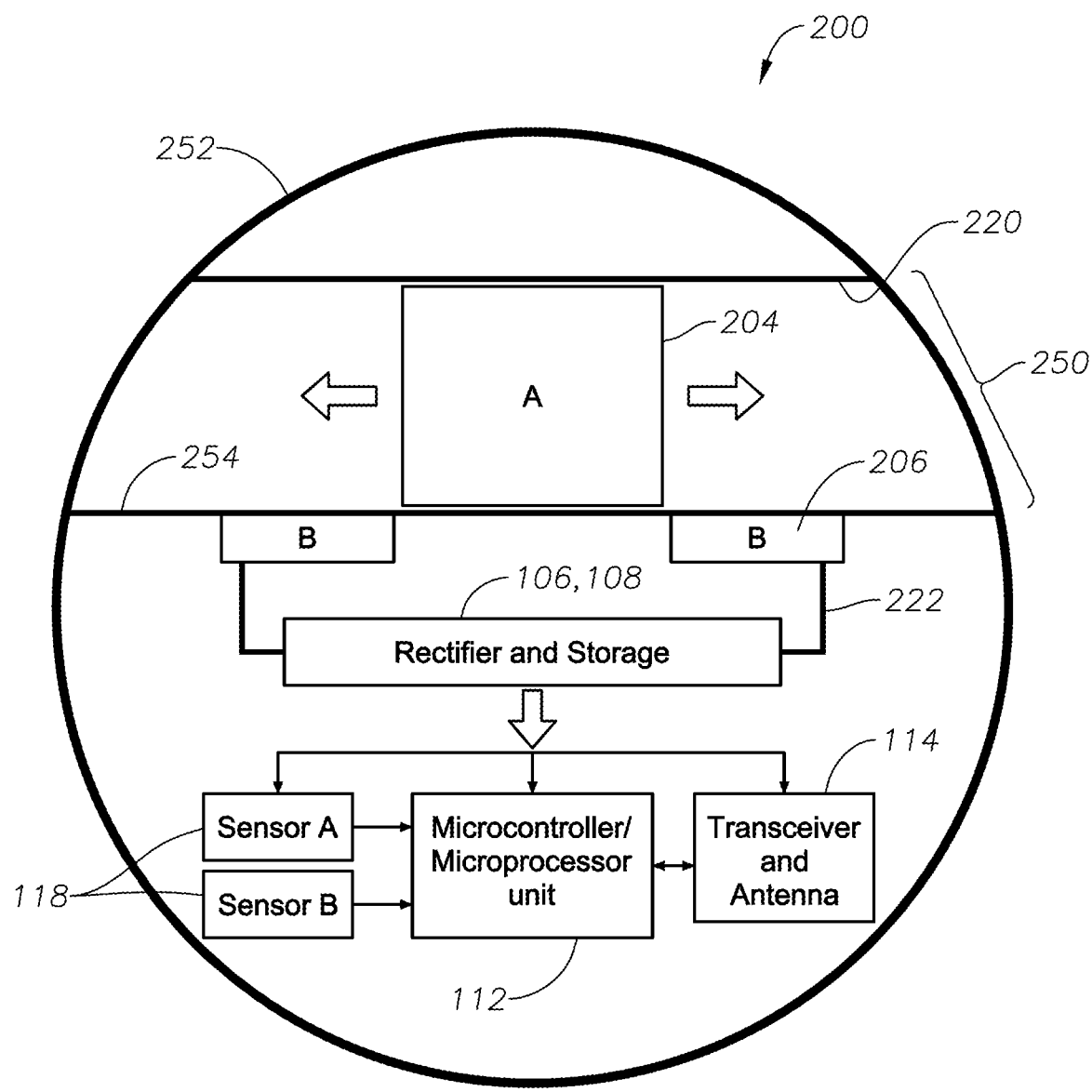
FIG. 2 is a schematic of a high temperature downhole miniature mobile sensing device comprising a high temperature downhole power generator, sensors, microcontroller/microprocessor and a communications module, according to one or more example embodiments.

It should be noted, however, that in FIG. 1 a spherical shaped MMSD is used as an example to illustrate how electricity can be generated using friction when the MMSD is flowing with mud, but the shape of the device can be of any shape. In MMSDs 100, 200 illustrated in FIGS. 1-2, the small spherical ball 204 and the rectangular bar 204 are enclosed in a tunnel 220 where they move or slide along a material deposited on the underside, on the plane 254 separating the two spheres when the MMSD 100, 200 travels with the mud flow. The material that the ball 204 and the bar 204 are made of, material A, and the material 206 on the underside, material B, are of opposite polarities. When they contact, charges move from one material to the other. Some materials have a tendency to gain electrons and some to lose electrons. If material A has a higher polarity than material B, then electrons are injected from material B into material A. This results in oppositely charged surfaces. When these two materials are separated there is current flow, when a load is connected between the materials, due to the imbalance in charges between the two materials. The current flow continues until both the materials are at the same potential. When the materials move towards each other again there is a current flow again, but in the opposite direction. Therefore, this contact and separation motion of materials can be used to generate electricity. The electrodes 222 facilitate current flow to the bridge rectifier 106 where the generated electrical energy is converted from an alternating current to a direct current by the rectifier circuit employing diodes. The generated electricity can be stored so that it can be used as a regulated power source even when there is insufficient vibration or mud flow. The storage unit 108 can be either a dielectric capacitor for use at high temperatures, a ceramic, an electrolytic or a super capacitor. By storing the energy in a capacitor, power can be provided continuously to the sensors 118 and the communication module 114.

The storage unit provides power to the microprocessor/microcontroller unit, which performs the power management and control functions of the system. The microcontroller is connected to a transceiver and an antenna. The transceiver employs low power wireless technologies such as low-power Wi-Fi, Bluetooth, Bluetooth Low Energy, ZigBee, etc. The antennas can be directional, omni-directional and point-to-point. They can also be planar antennas such as monopole, dipole, inverted, ring, spiral, meander and patch antennas.

Figure 3:
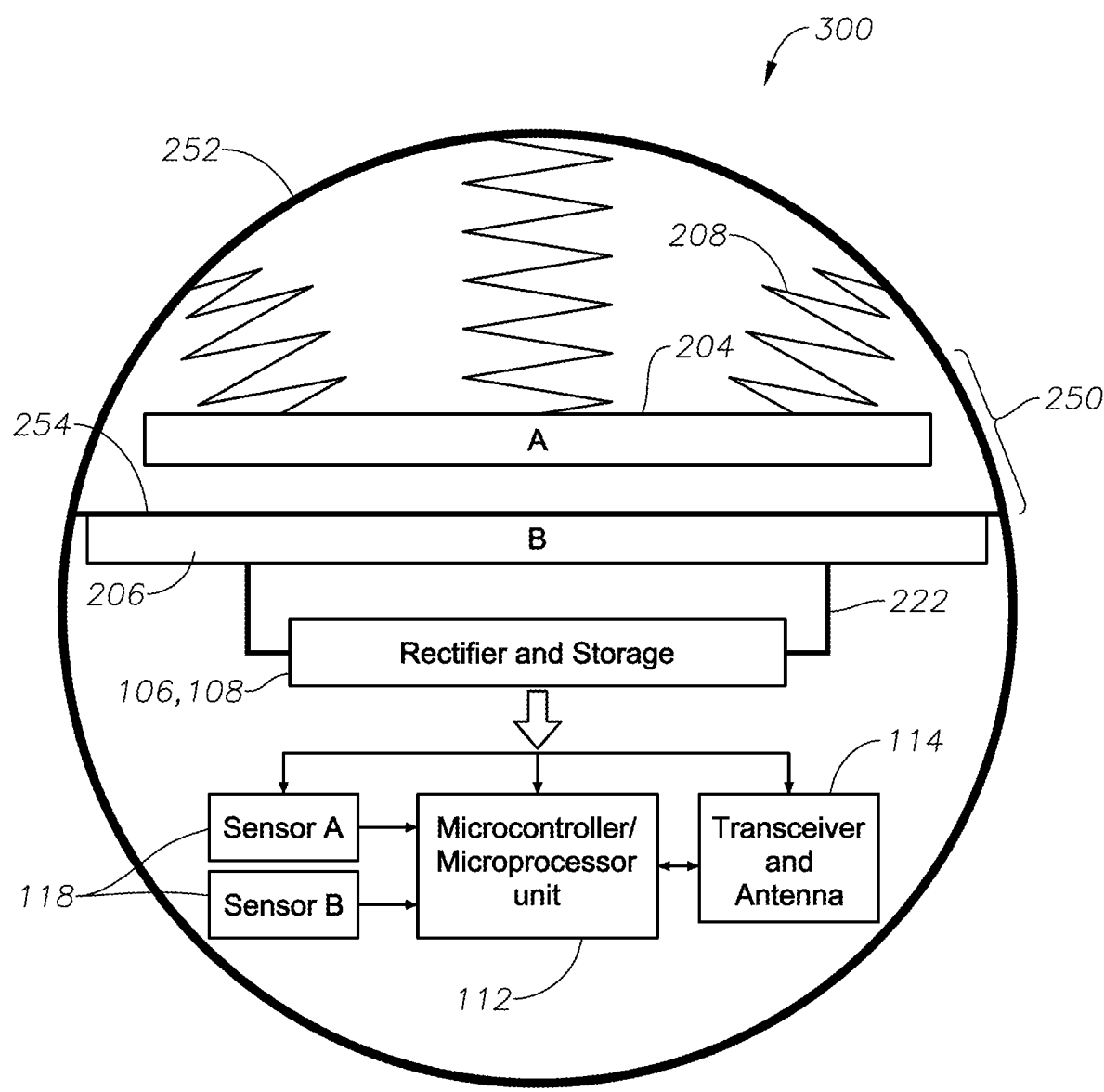
FIG. 3 is a schematic of a high temperature downhole miniature mobile sensing device comprising a high temperature downhole power generator, sensors, microcontroller/microprocessor and a communications module, according to one or more example embodiments.

In FIG. 3, a rectangular plate 204, made from material A is attached to springs 208 and another material 206, material B, is fixed below it. When the MMSD 300 travels with the mud it experiences vibrations and material A will contact and separate from material B thus, generating electricity. The electrical signal is changed from an alternating current to a digital current with the aid of a bridge rectifier 106 and the charge can be stored in a capacitor 108. Storage is important because otherwise the charge may be consumed as soon as it is harvested.

Figure 4:
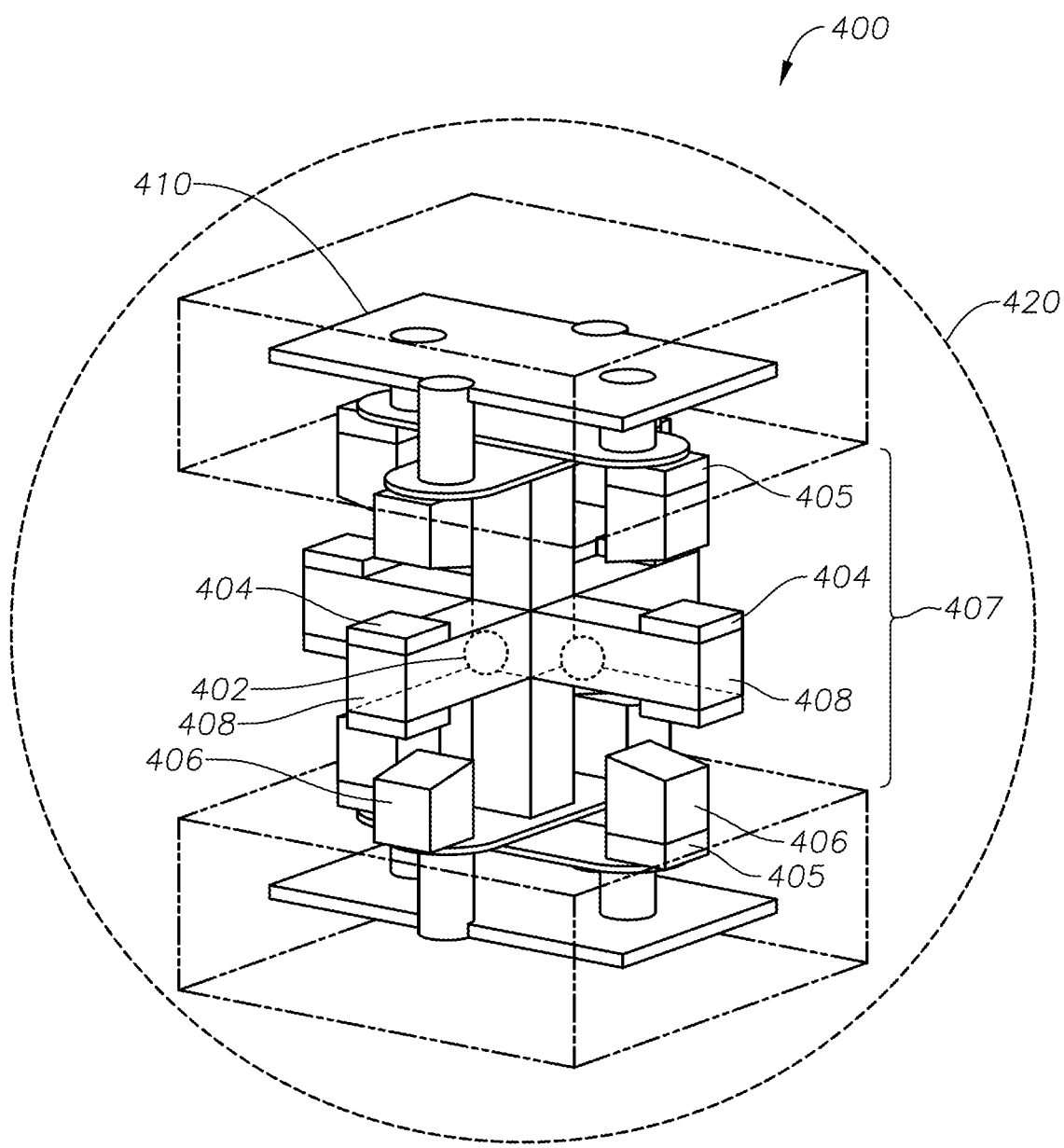
FIG. 4 is a schematic of a high temperature downhole miniature mobile sensing device comprising a high temperature downhole power generator, sensors, microcontroller/microprocessor and a communications module, according to one or more example embodiments.

In some embodiments, a MMSD has a power generator 407 that may include a lever based power generation system 400, as shown in FIG. 4, for example. The MMSD 400 has a power may include one or more levers 408 that can function as separate devices. The number of levers 408 can be increased according to space availability. The lever 408 can be a beam, as illustrated in FIG. 4, or it can be a rod. The beam can have a hollow structure and can be pivoted about a fixed hinge or central fulcrum. The system 400 may include one or more frictionless movable objects 402, such a spherical ball that may be located inside the beam and travel inside the beam tunnels. The system 400 is designed in such a way that each frictionless movable object 402 can travel only inside one beam and that each beam functions independently from each other. Alternatively, the levers can be connected to each other and pivoted at one single hinge or fulcrum. Therefore, the motion in this case may be dependent on each other. System 400 may also include a first material, material A 404 of a certain polarity, which may be placed directly opposite a pad 405 that is attached to another material, material B 406 that is of opposite polarity to the first material 404. The system 400 can include four pads for each corner of the levers 408, as shown in FIG. 4. The pads 405 can be connected to a sensor and instrumentation unit ("S&I unit") 410, which may include one more sensors to measure various downhole parameters such as temperature and pressure, for example, a bridge rectifier, an energy storage unit, a microcontroller or microprocessor, and a transceiver unit.

Figure 5:
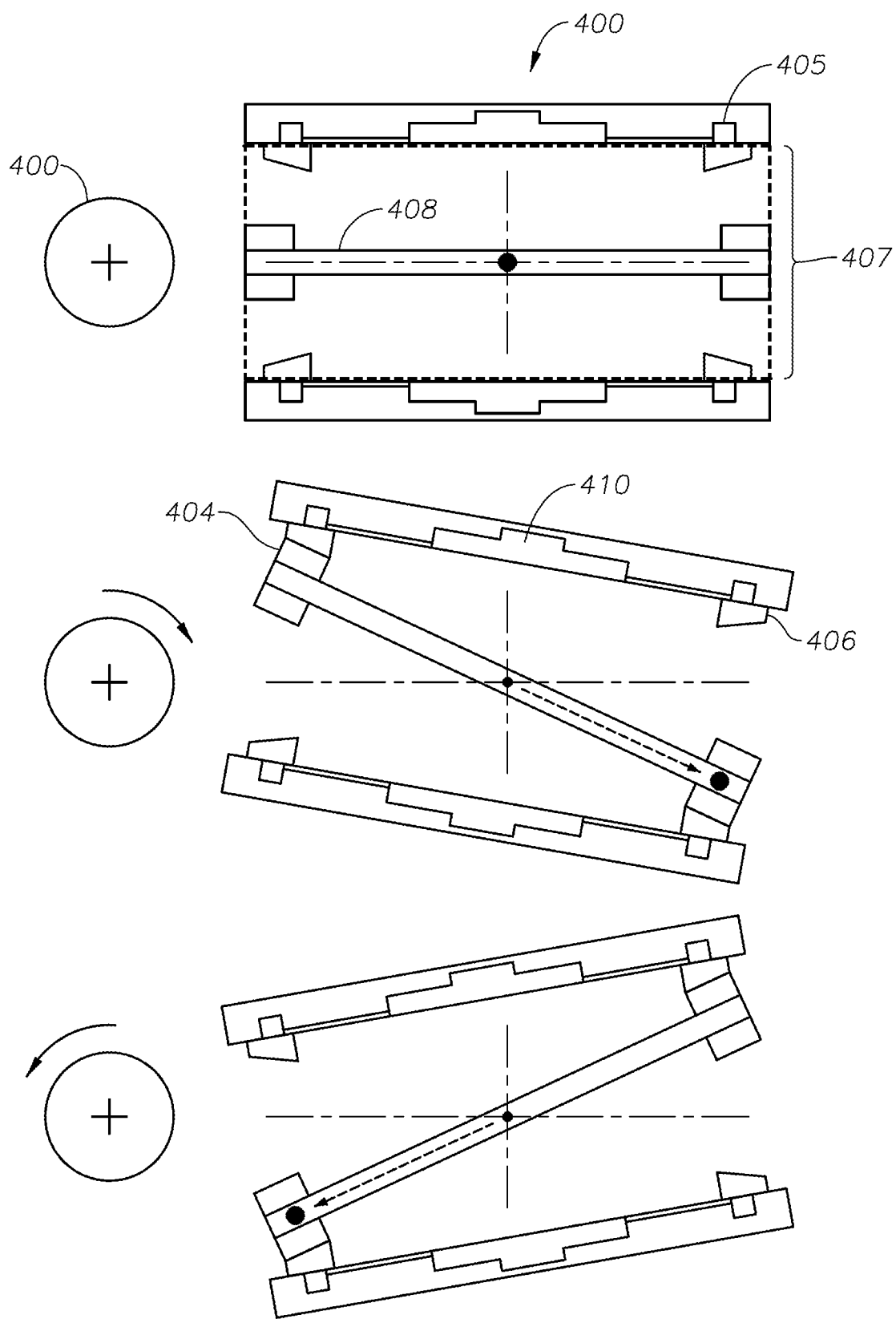
FIG. 5 is a schematic of a high temperature downhole miniature mobile sensing device comprising a high temperature downhole power generator, according to one or more example embodiments.

FIG. 5 illustrates an example electricity generation mechanism to power the S&I unit 410. As one of ordinary skill in the art would appreciate, fluid flow inside a wellbore can be laminar or turbulent. The flow regime depends on the pipe diameter as well as the velocity, density, and dynamic viscosity of the drilling fluid. In an oil or gas wellbore, laminar flow is only encountered in slow flowing conditions, for example near the bottom of a wellbore, and turbulent flow can be assumed as the general flow regime in wellbores. In the turbulent flow regime, the fluid undergoes irregular fluctuations leading to vortices and a flatter velocity profile. Therefore, a device 400 that is enclosed in a spherical shell as shown in FIG. 5, for example, will move in different directions when travelling with the drilling fluids inside a wellbore. This movement can trigger the lever 408 to move in different directions causing the first material 404 at the corner of the lever 408 to move towards second material 406, which is attached to pad 405. However, since the flow is turbulent and undergoing changes in both magnitude and direction continuously, one can expect material 404 and material 406 to be in contact many times during the device's journey inside the wellbore. This contact and separation can be exploited to generate electricity. When material 404 of a given polarity contacts material 406 of an opposite polarity or a polarity as distant as possible to material 404, there is an exchange of charges between material 404 and material 406. Some materials are more inclined to gain electrons and some to lose electrons. Electrons will be injected from material 406 into 404 if material 404 has a higher polarity than material 406, resulting in oppositely charged surfaces. The separation of these materials gives rise to a flow of current through a load and hence a continuous output to the S&I unit 410 in the device 400. The pad 405 connected to material 406 serves both as a contact material as well as a conductive electrode. The pad 405 is connected to a bridge-rectifier (not shown), which turns the alternating current from the contact-separating motion to direct current. This current can be stored in an energy storage unit such as a capacitor so that regulated power is available to the S&I unit 410 even when a fluid flow might be suspended temporarily. The capacitor can be a dielectric capacitor, ceramic film capacitor, electrolytic capacitor, supercapacitor, double-layer capacitor or a pseudo-capacitor. The energy storage unit provides power to the sensors, microcontroller/microprocessor, and transceiver. Power management, a key issue in smart devices, is performed by the microcontroller/microprocessor unit. The sensors and transceivers are in operation only at set times, and depths in order to conserve power. It should be noted, however, that the device is designed in such a way that there will always be sufficient contact (sufficient enough to produce the required energy) between materials 404 and 406 irrespective of the direction the device is moving in the fluid.

Figure 6:
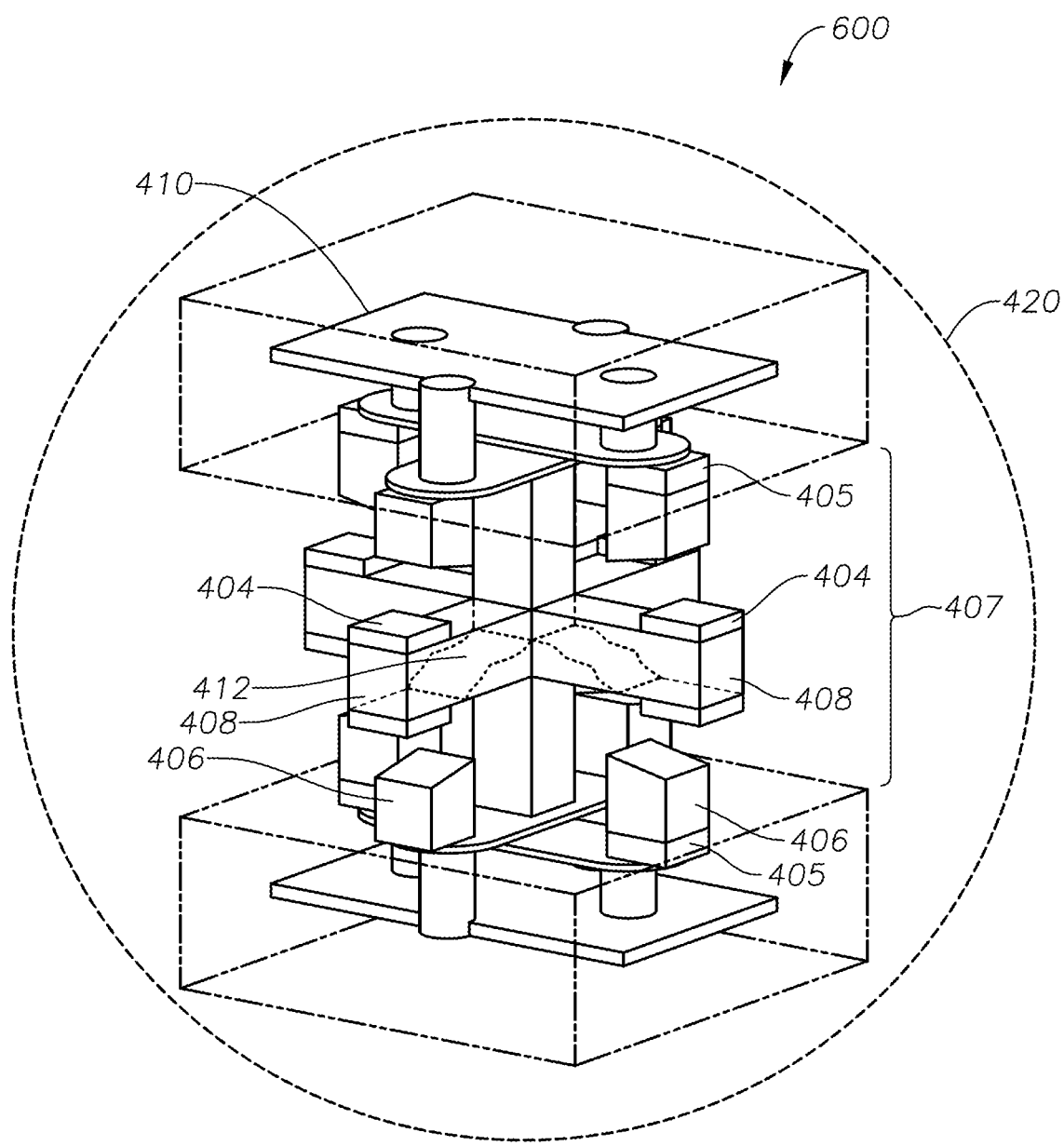
FIG. 6 is a schematic of a high temperature downhole miniature mobile sensing device comprising a high temperature downhole power generator, sensors, microcontroller/microprocessor and a communications module, according to one or more example embodiments.

In some embodiment, the frictionless movable object 402 can be replaced by a liquid 412 of a suitable density and weight, as shown in FIG. 6, for example. In FIG. 6, system 600 includes a liquid 412 in each of the two levers 408, and the system can be designed in such a way that the each fluid pocket can flow only inside one beam, one fluid pocket per beam, and that each beam functions independently of each other. Alternatively, the system 600 may include a single pocket of fluid that can flow inside any beam. System 600 may also include a first material 404 of a certain polarity, which may be placed directly opposite a pad 405 that is attached to another material 406 that is of opposite polarity to the first material 404. The system 600 can include four pads for each corner of the levers 408, as shown in FIG. 6. The pads 405 can be connected to a sensor and instrumentation unit ("S&I unit") 410, which may include one more sensors to measure various downhole parameters such as temperature and pressure, for example, a bridge rectifier, an energy storage unit, a microcontroller or microprocessor, and a transceiver unit.

Systems 400 and 600 are designed to be used in high temperature environments (>125° C.). The lever 408, which may be a beam or a rod, can be made of any metal or alloy that can withstand temperatures of 125° C. or higher. The first material 404 and second material 406 can be made of materials such as, Polytetrafluoroethylene (PTFE), Polyethylene terephthalate (PET), Polydimethylacrylamide (PDMA), Polydimethylsiloxane (PDMS), Polyimide, Copper, Silver, Aluminum, Lead, Elastomer, Teflon, Kapton, Nylon or Polyester. The frictionless movable object 402 can be made of metal or alloy that can withstand 125° C. or higher, and the liquid 412 can be any low viscosity liquid that is flowable inside the beam or rod and can withstand temperatures of 125° C. or higher.

The power consumption must be minimized and therefore, should be carefully controlled. The microprocessor/microcontroller unit 112 performs the power management in the MMSD 100, 200, 300, 400, 600 and 700. It interprets and processes information stored in the memory and analyzes the data obtained from the sensors 118. The sensors 118, memory and the transceivers and antenna in the communication module 114 have its own level of power usage. The sensors 118 only require power when it has to sense data from the environment and store it in memory. It has low or no power consumption after this process and can go to 'sleep' until it has to obtain data again. If the sensor 118 is required to continuously obtain data it has to be 'active' continuously and the microcontroller/microprocessor 112 is required to obtain data at a high sample rate. Since this will rapidly drain power from the storage the sensors 118 are designed to be 'active' at certain periods of non-overlapping times. Sensors 118 can also be designed to be 'active' at certain depths, where depth can be measured by an accelerometer, magnetometer or a gyroscope. Similarly, the transceivers 114 are designed to transmit and receive data at predetermined times or when triggered by an external signal. Moreover, since transceivers 114 require more energy than sensors 118 and the microcontroller/microprocessor unit 112 to transmit/receive data, only a sample of data after analysis by the microcontroller/microprocessor, rather than all the sensed data, could be transmitted/received to save power downhole. The antenna can be on-chip or detachable and is integrated with the transceiver to form a communication module 114. The transceiver 114 employs low power wireless technologies such as low-power Wi-Fi, Wi-Fi Direct, Bluetooth, Bluetooth Low Energy, ZigBee, etc. Higher frequencies allow a better signal and a longer transmission distance. However, the system must be optimized since attenuation and power requirements are also higher at higher frequencies. The antennas can also be directional, omni-directional and point-to-point. They can also be planar antennas such as monopole, dipole, inverted, ring, spiral, meander and patch antennas. RFID tags can also be incorporated into each MMSD 100, 200, 300, 400, 600 so that data obtained at the surface can be uniquely identified and linked to the correct MMSD. Passive RFID tags do not require a power source but have low bandwidth and high failure rates in data transmission. Active tags can be used instead since each MMSD has a power generator.

Multi-channel modules can be designed to optimize the space available in a MMSD. For example, high temperature co-fired ceramic (HTCC) substrates of Alumina can used for the electronic boards. These substrates are generally plated with Cu, Ni and Au for soldering and wire-bonding. The circuit dies in these boards can be processed independently and assembled into a single device as a final step. The circuit boards can be interconnected with each other using ceramic single inline package headers on brazed pins (BeNi contacts). BeNi is commercially available and is a standard technology for high temperature packaging. HTCC packages have excellent mechanical rigidity, thermal dissipation and hermeticity, important features in harsh, high temperature applications. Silicon-on-insulator (SOI) technology can be utilized for active electronics in the system. Compared to bulk Si technology, SOI significantly reduces leakage currents and variations in device parameters, improves carrier mobility, electromigration between interconnects and dielectric breakdown strength. Silicon Carbide (SiC) based electronics has superior properties to silicon based electronics and is another candidate for harsh environment applications, which are thermally, mechanically and chemically aggressive. SiC has many polytypes but 6H and 4H (H=Hexagonal) are the two most commonly used polytypes. Silicon has a bandgap of 1.12 eV and loses its PN junction characteristics around 200-225° C. SiC on the other hand has a bandgap of greater than 3 eV and can tolerate temperatures up to 100° C. Compared with Si. SiC also has a higher melting point (1420° C. vs 2830° C.).

The system can have application-specific integrated circuits (ASICs), or field programmable gate array (FPGA) circuits. Compared to ASICs, FPGA circuits do not require layouts, masks or other manufacturing steps, has a simpler design cycle, a more predictable project cycle and field reprogrammability. FPGAs can be re-used and are cheaper than ASICs. ASICs require designs based on custom specifications. One of the main disadvantages of FPGAs is the high power consumption compared to ASICs. There is no control over power optimization in FPGAs whereas low power techniques can be used to optimize power consumption in ASICs. Static random access memory (SRAM) can be reprogrammed. Since the FPGA can be reprogrammed easily a design can be loaded into the part, tried at-speed in the system and debugged when required. This is ideal for board-level testing where the FPGA can be configured to verify the board or the components on the board. After the testing is finished the FPGA is reconfigured with the application logic. However, the main advantage of SRAM is also its main disadvantage since the IC loses its programming when the power is turned off. Therefore, SRAM based FPGAs must be reprogrammed each time power is applied so an external memory is needed for permanent storage of the program. This is not feasible when board space is at a premium like in downhole applications. Therefore, electrically erasable programmable read only memory (EEPROM) is a more feasible option when the MMSD is used in downhole applications. EEPROM has slow write times but this is tolerable since the main code that is usually used at start up is only modified during development, then left alone. The EEPROM should have the capability to be configured as a serial interface. Serial interface are preferred over parallel interfaces to reduce the number of interconnections and reduce crosstalk.

Materials A and B in the power generator 250, 407 are required to withstand high temperatures (>125° C.) and have good stability with little or no degradation in material properties after many cycles and they should not get damaged due to shock, vibration or high pressures. Some suitable materials are Copper, Aluminum, PTFE, Teflon, Kapton, Lead, Elastomer, PDMA, or any other material that can cause static electricity, or any material with similar or better thermal, mechanical and chemical properties for downhole environments, which can also be deposited as thin films. Also, the materials should be relatively cheap if they are to be used in power generators to generate electricity for many transceivers. When choosing materials it is important to remember that they have opposite polarities or polarities as distant as possible from each other. The shell 252 that the sensors are enclosed in must be robust enough to withstand the high temperature, high pressure corrosive and abrasive environments. Moreover, the shell 252 material should be able to preserve flexibility and elasticity to improve the energy conversion efficiency of the power generator. The shell 252, 420 can be designed from a polymer material such as elastomer, which is already used in downhole tools, or any other material that has excellent heat conduction properties and a low Young's modulus. Packaging and encapsulation is mainly done to protect the MMSD components from mud and other fluids in the formation, which may degrade its performance. However, it is important that the packaging and encapsulation does not in any way diminish the energies being harvested. The packaging and encapsulation should maintain or amplify the energies being harvested. In order to minimize vibrations in the sensors, electronics and the communication module they can be mounted and installed in ways to isolate vibrations. Chemical coatings can be used to further protect the MMSD and its components from the harsh downhole environment. They can be polymeric coatings, which can be used to provide a uniform and pinhole free layer on sensor and electronic boards. These coatings can withstand continuous exposure to high temperatures for long periods of time, prevents corrosion of electrodes and is an excellent dielectric. Thermal insulation significantly extends the life and durability of the sensors and electronics. The outer protective shell 252, 420 shields all the components inside from the environment and can be epoxy, resin-based materials, or any material that has good thermal conductivity properties.

Vibration and movement due to the flow of mud is absorbed by the MMSD and this triggers the contact and separation between two materials of opposite polarities. The amount of vibration and movement depend on the flow speed of the mud, the size of the hole and the drill string assembly in the hole amongst other things. Using this principle, the MMSDs illustrated in FIGS. 1-3, 4 and 6 can be used for many downhole applications.

Therefore, the example embodiments described above relate to a novel high temperature (>125° C.), self-powered MMSD that can be sent downhole with mud flow, to activate downhole tools and/or measure downhole parameters such as pressure and temperature, which could then transmit this information to communication modules when travelling up the annulus to the surface.

Figure 7A:
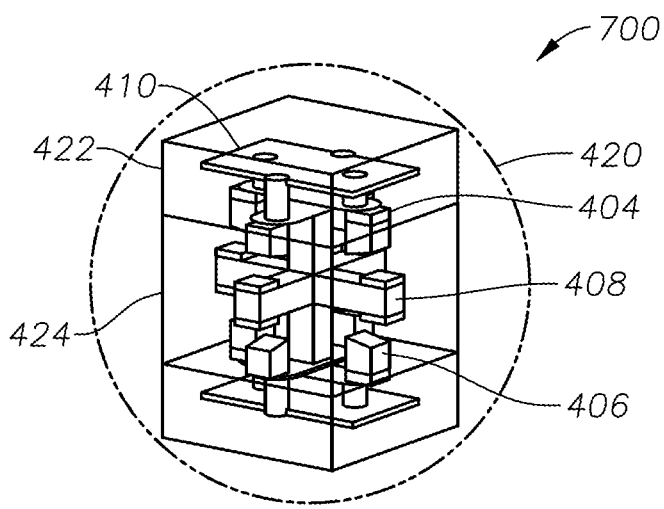
FIGS. 7A-D illustrates a system where a plurality of high temperature MMSDs are sent downhole through the drill string via mud flow, according to one or more example embodiments.
Figure 7B:
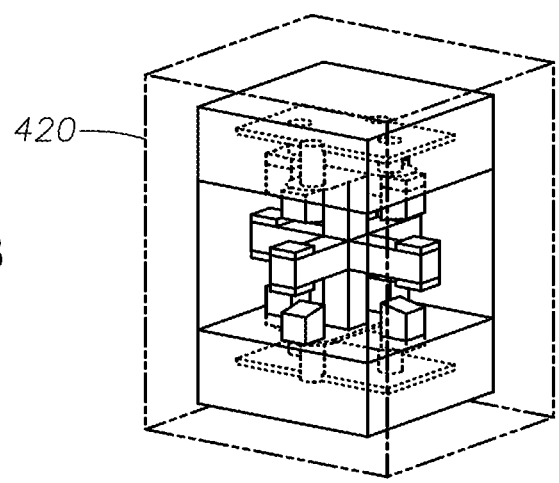
Figure 7C:
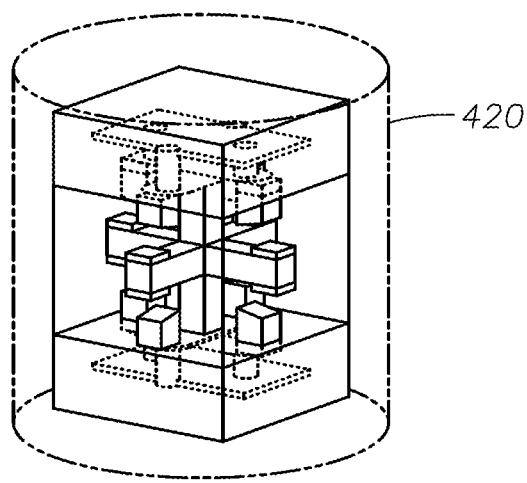

FIG. 7A illustrates an MMSD, according to one or more example embodiments. In this embodiment, the sensors, microcontroller, and transceiver can be placed in a first housing 422 to minimize vibration, the power generating lever system 400, 600 may be placed in a second housing 424. In order to minimize and isolate vibrations in the sensors, microcontroller, and transceiver, mounts and valves can be installed within the body of the MMSD, and materials such as Steel, Titanium, Silicon Carbide, Aluminum Silicon Carbide, Inconel, and Pyroflask, can be used for housing 422 to reduce the effect of high temperature. Since materials are not organic, they may not corrode and provide longevity to the MMSD. The material for housing 424 of the power generating lever system on the other hand can be designed to preserve its flexibility and elasticity, and to maximize vibrations, thereby improving the energy conversion efficiency. However, it but must be optimized so that the building blocks of the lever system will not be damaged. Therefore, for optimization specific materials for the building blocks of the lever system, housing 424 can be designed from a polymer material such as elastomer, which is already used in downhole tools, or any other material that has excellent heat conduction properties, and a low Young's modulus. Packaging and housing is mainly done to protect the lever system from mud and other fluids in the formation, which may degrade its performance. However, it is important that the packaging and housing does not in any way influence the energies being harvested, by reducing the vibration, for example. The housing and packaging should maintain or amplify the energies being harvested. The entire device can be further packaged or encapsulated in a spherical protective cover 420, as shown in FIG. 7A, to shield the device 700 from the outside environment, and to ensure that the internal components do not get in direct contact with drilling fluids, for example. The protective cover 420 can be made of any material, such as epoxy, resin-based materials, or any material that can withstand temperatures higher than 125° C., has good thermal conductivity properties and can withstand pressures typically encountered inside a wellbore. The device can also be encapsulated in a cube or a capsule 420, as shown in FIGS. 7B and 7C.

Figure 7D:
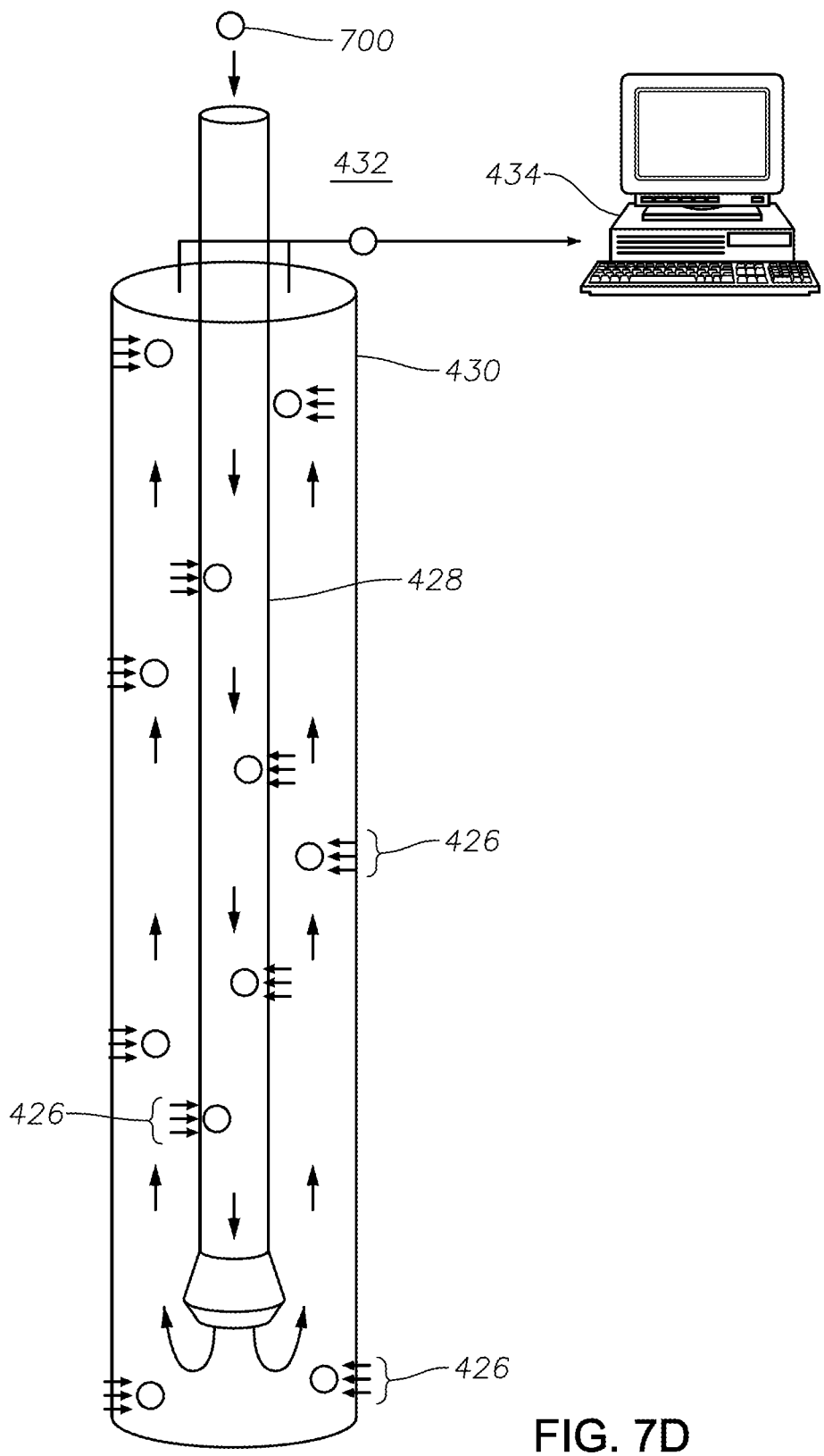

The device 700 can then be deployed in a wellbore 430 to travel with the drilling fluids, through the drill string 428 to the bottom of the wellbore 430, and then up the annulus to the surface 432, as shown in FIG. 7D. The device 700 travels in the opposite direction when the drilling fluid flow direction is reversed. This method of deployment of a mobile sensing device opens up the possibility to perform a wide range of functions downhole. The device 700 can obtain downhole parameters 426 such as pressure and temperature while travelling inside the drill string 428 and the wellbore 430, and this data can be downloaded once the device 700 is recovered at the surface 432. The device 700 can also be in a system where it continuously flow through the surface, drill string, and annulus loop, where data can be downloaded wirelessly, at a data acquisition device 434 placed at the surface of the flow loop. The device 700 can also be used to activate or deactivate a downhole tool or to release a tool or chemical that is enclosed within that downhole tool. In the event there are several devices 700 inside a wellbore 430, they can be programmed to communicate with each other to form a sensor distribution network or a pathway to transmit data from the bottom of the wellbore 430 to the surface 434. Also, if there is a wireless transmission network located inside or outside a drill string 428, for example, transceiver units (not shown) along the drill string 428, the devices 700 can communicate with the units to transmit data along the units to the surface 432. This data in turn can be verified once the devices reach the surface. The devices can also be used to obtain information of the condition of the wellbore. For example, if there is a mud cap or cutting, the devices may take longer to reach the surface or transmit data to a given transceiver unit. If each transceiver unit gets a signal every time a device passes by, then the signal may be delayed if the device encounters a wellbore problem, such as an object that may be stuck downhole.

Figure 8:
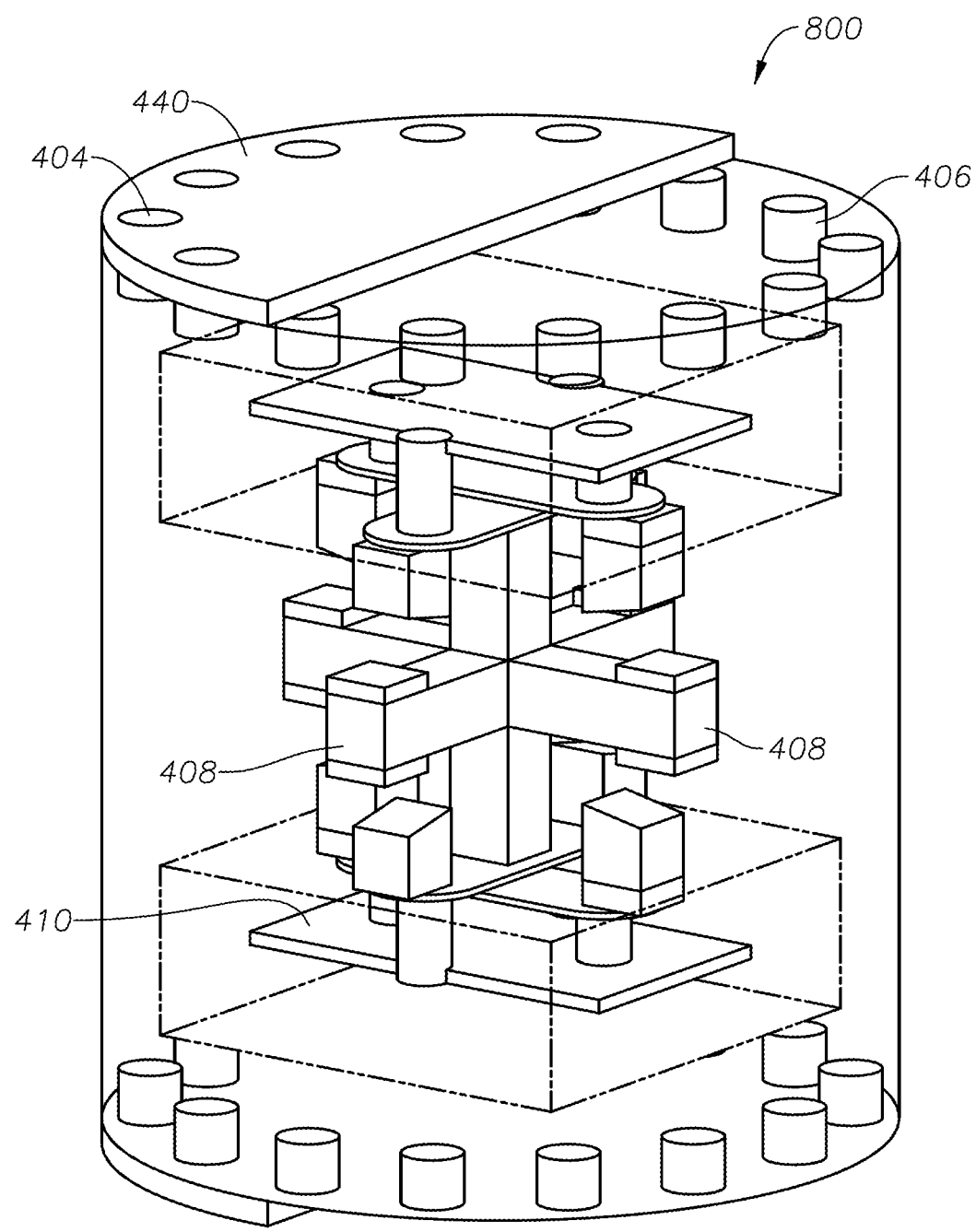
FIG. 8 is a schematic of a high temperature downhole miniature mobile sensing device comprising a high temperature downhole power generator, sensors, microcontroller/microprocessor and a communications module, according to one or more example embodiments.

FIG. 8 illustrates a further embodiment, where device 800 is adapted to further exploit the turbulent flow of the drilling fluid. In this embodiment, a half weighted rotor or full rotor 440 is installed at the top and bottom of the device 800. At the bottom of the rotor are circular pads coated with material 404 and at the top and bottom are circular pads coated with material 406 which is connected to the S&I unit 410. The rotor 440 spins about an internal axis and whenever the magnitude or direction of the mobile sensing device 800 changes, the angular speed and the displacement of the rotor 440 changes. When the rotor 440 rotates, material 404 slides over material 406, thereby leading to contact and separation motion, and a current flow to the S&I unit 410 after going through a rectifier and an energy storage unit. In this way the device 800 can exploit both axial and radial downhole energies while flowing with the drilling fluid. The device 800 can be encapsulated in a protective cover as described in the previous embodiments.

Alternatively, a drilling sub can be run inside the wellbore as part of the drilling assembly to measure downhole parameters as well as drilling dynamics parameters. The data can be downloaded once the drilling assembly is pulled out of the wellbore or can transmit data in real time when coupled with a wireless data telemetry unit, such as a mud pulse telemetry system or an acoustic telemetry unit. The device does not depend on a flow to function, therefore, the drilling sub can be run inside a wellbore that is experiencing lost circulation for example to obtain information about the exact location of the fractures as well as downhole temperature before performing remedial action to cure losses such as pumping lost circulation material (LCM) through a cement retainer. In this case, knowing the exact location of the fracture allows the driller to set the cement retainer just above the fractures therefore, increasing the probability of the lost circulation material to go directly into the fractures. In the case of LCM that is activated by temperature, knowing the downhole temperature prior to pumping the lost circulation material aids in the optimization of the LCM so that the LCM will solidify at the temperature near the fractures and cure lost circulation.

FIG. 9 illustrates a system 900 including one or more MMSDs 700, according to one or more example embodiments. As illustrated in this figure, the MMSDs in FIGS. 4-8 can be embedded into a drilling sub or drilling pipe 436. There can be several devices 700 placed either in a radial pattern, which can be repeated multiple times on the sub 436, or it can be placed anywhere in any pattern on the drilling sub. When embedded into a drilling sub 436 in any direction, MMSDs 700 in FIGS. 4-8 can maximize vibration energies in a wellbore, such as the vibration experienced by the drill string assembly while drilling, tripping in and out of wellbore, reaming etc. This movement can trigger the lever to move in different directions causing material A at the corner of the lever to move towards material B at the pad and be in contact with it. The drilling sub 436 can be run inside the wellbore as part of the drilling assembly to measure downhole parameters as well as drilling dynamics parameters.

The device 700 can also be adapted to exploit lateral/transverse/radial movements such as rotation of the drill string while drilling a wellbore as well as torsional and lateral vibrations of the drill string. Moreover, there are lateral/transverse/radial movements of the drill string when it is being pulled out of a wellbore, when it is being run inside a wellbore and during a reaming trip.

The embedded MMSDs 700 can be utilized to measure downhole geological, drilling dynamics and directional parameters. Moreover, they can also be arranged in a configuration to transmit these parameters in a communication channel along a drill string in real-time. The communication channel with multiple transceivers along the drill string employs low power wireless technologies such as low-power Wi-Fi, Bluetooth, Bluetooth Low Energy, ZigBee, etc. Higher frequencies also allow for a better signal and a longer transmission distance.

FIG. 10 illustrates a communication system 1000 including one or more MMSDs 700, according to one or more example embodiments arranged in a ring configuration embedded in drill subs/pipes 436 to measure downhole geological and drilling parameters as well as transmit this data along a communications channel 442 along a drill string in real time. The transceiver employs low power wireless technologies such as low-power Wi-Fi, Bluetooth, Bluetooth Low Energy, ZigBee, etc. Higher frequencies allow a better signal and a longer transmission distance. However, the system may be optimized since attenuation and power requirements are also higher at higher frequencies. The antennas can be directional, omni-directional and point-to-point. The can also be planar antennas such as monopole, dipole, inverted, ring, spiral, meander and patch antennas. In this wireless mode of data telemetry data can be transmitted along the drill string wirelessly, moving along the communication units as in a relay from the bottom to the surface and from the surface to the bottom. The devices can be arranged in a ring configuration or any other configuration and may detect one or more downhole parameters. They can also be placed on drill pipes according to the maximum distance that a signal is able to travel wirelessly. Any data obtained by transceivers can be immediately transmitted to the surface by the telemetry method described before. The high transmission rate is also no affected by in-situ mud types.

The example embodiments disclosed provide downhole power generation sufficient to supply required power source to power each data relay device along the drill string to achieve a much high data transmission rate, that is also not affected by in-situ mud types. It is therefore designed to be a self-powered telemetry system, particularly suitable for extra high temperature (>125° C.) environments.

Example embodiments in FIG. 10 relate to a high temperature, self-powered, downhole communications system (HTSP-DCS) to increase the speed and enhance the reliability of data transmission between the bottom of the drill string and the surface in high temperature wellbores. Increasing the speed of data transmission allows the accurate characterization of the formation being drilled and the downhole environment so that the target reservoir can be reached according to plan. Moreover, the smart drill pipe concept, where real time distributed sensing data can be obtained from the surface to the bottom of hole, enables the real-time detection of kicks in deep reservoirs with partial/severe loss zones leading to precise control of the well.

It should be noted, however, that designs in FIGS. 4, 6, and 8 are not dependent on drilling fluid flow to operate. Therefore, this feature enables a number of downhole applications. The drilling sub 436 can be run inside a wellbore that is experiencing lost circulation for example to obtain information about the exact location of the fractures as well as downhole temperature before performing remedial action to cure losses such as pumping lost circulation material (LCM) through a cement retainer. In this case, knowing the exact location of the fracture allows the driller to set the cement retainer just above the fractures therefore, increasing the probability of the lost circulation material to go directly into the fractures. In the case of LCM that is activated by temperature, knowing the downhole temperature prior to pumping the lost circulation material aids the in the optimization of the LCM so that the LCM will solidify at the temperature near the fractures and cure lost circulation.

The device and communication channel arrangement can be used to aid pressurized mud cap drilling for example, a variant of managed pressure drilling, to drill ahead in total lost circulation zones. In pressurized mud cap drilling a light annular mud (LAM) is injected below a rotating control device (RCD) to replace the drilling fluid that was in the wellbore at the onset of lost circulation. Then a sacrificial fluid is pumped through the drill string that flows into the fractures. The LAM balances the pore pressure of the formation above the fractured zone while holding a certain surface back pressure. Drilling can then be continued where the sacrificial fluid and the cuttings flow into the fractures. Kicks are monitored by the surface back pressure and the pump pressure. In the event of a kick more LAM is pumped down the annulus. However, one of the main drawbacks of this method is that a kick can only be measured at the surface and if not observed carefully could easily lead to a well blow out. If devices and communication units for example with pressure sensors were placed along the drilling assembly, any change in the pressure in the annulus can immediately be detected at the surface and LAM can be revised and pumped down the annulus before the kick travels up the annulus. Therefore, the device and the communication channel can be a valuable tool when drilling in lost circulation zones.

The downhole power generator described in the above example embodiments is designed to generate electricity by using friction between two materials of opposite polarities. With the aid of unique apparatuses we describe how to fully exploit the mechanical/hydraulic energies usually encountered in a drilling environment, such as vibration and mud flow, to generate friction between two materials. However, the design of such a generator must be carefully designed and optimized when utilized in a well to fully exploit the available downhole energy sources without causing interference with exploration and production activities. Vibration can be triggered directly by mechanical motion and mud flow and in-directly with the aid of mud flow and a mini-turbine. Generating electricity by friction is based on the principle that an object becomes electrically charged after it contacts another material through friction. When they contact, charges move from one material to the other. Some materials have a tendency to gain electrons and some to lose electrons. If material A has a higher polarity than material B, then electrons are injected from material B into material A. This results in oppositely charged surfaces. When these two materials are separated there is current flow, when a load is connected between the materials, due to the imbalance in charges between the two materials. The current flow continues until both the materials are at the same potential.

When the materials move towards each other again there is a current flow again, but in the opposite direction. Therefore, this contact and separation motion of materials can be used to generate electricity. Moreover, the materials used to build the power source such as Aluminum, Copper, Kapton, PTFE, PDMA, or any other material that can cause static electricity and can work at high temperatures (>125° C.).

Systems described in the above example embodiments include wireless communication technology as a data transmission method. Data transmission data rates up to a million times faster than mud pulse telemetry (bits per second to megabits per second) can be achieved by coupling wireless communication technology with transceivers placed at specific locations in the drill string to transmit data from the MWD and LWD tools to the surface. Increased data transmission rates provides significant advantages in a drilling environment such as the opportunity to immediately respond to well control problems and revise mud programs. The mud pulse telemetry system is replaced by an array of transceivers placed at specific locations on the drill pipe, from the bottom of the well to the surface. Each transceiver is connected to the power generator mentioned above and is triggered by mechanical/hydraulic motions in a downhole drilling environment. The distance between these transceivers are dependent on the wireless communication technologies used, the power provided by the power generator, the downhole environment and the power management circuit of the microcontroller amongst other variables. This transceiver array transmits data, from one transceiver to another as in a relay, from the bottom to the surface of the well.

Due to the increased speed of wireless communication compared to mud pulse telemetry more data can be sent per second increasing the resolution of the data obtained at the surface. Sensors can be integrated with the communication module described in the above example embodiments. This is achievable since the sensors and the transmitters do not operate simultaneously. Once a tool stops it operation it can shut down and go to sleep to reduce power usage. The instructions to do so are handled by the microcontroller unit. The smart drill pipe gives real time distributed sensing data, which can be used to effectively monitor the well and respond immediately if there is a problem. The number and type of sensors in a communication module depend on the availability of power at each communication module.

Example embodiments described in the above sections also describe downhole power generation systems sufficient to supply required power for downhole sensors and instrumentation. The system is not affected by in-situ mud types. It is therefore designed to be a self-powered power generator, particularly suitable for utilization in high temperature (>125° C.) environments.

Advancements in MEMS (micro-electro-mechanical systems) technology have paved the way for building these devices at the micro or nano scale and then integrating them together to create low-cost, miniature, smart, MMSDs that can be used in challenging applications. Miniature Mobile Sensing Devices (MMSDs) are useful in downhole applications because they can be deployed down a well with mud flow to measure downhole parameters. They can flow right to the bottom of a well and up again to the surface therefore, providing a full profile of the wellbore. In the embodiments disclosed above, examples of how MMSDs provide clear advantages over current technologies such as wireline and MWD/LWD with respect to size, cost, sensitivity, power, mobility and potential downhole applications are shown. The present disclosure describes how energy can be harvested by the motion of MMSDs in a flow and how this energy can be converted to electricity to power the sensors, instrumentation and communication module in the devices. It also describes several applications of these MMSDs such as sensing, actuating, monitoring as well as transmitting and receiving data in a downhole environment.

One feature enabled by the designs in FIGS. 4-6 and 8 is that it can be used as a real-time, self-powered active sensor to measure vibration and rotational speed of the drill string. This means that the device can power and sense specific parameters at the same time. The magnitude and frequency of the impact of material A on material B will be proportional to the static electricity generated in the lever system. Similarly the frequency of material A sliding over material B will be proportional to the static electricity generated. Therefore, the device is not only a power generator but it can also act as both a vibration and rotational speed sensor.

Figure 11:
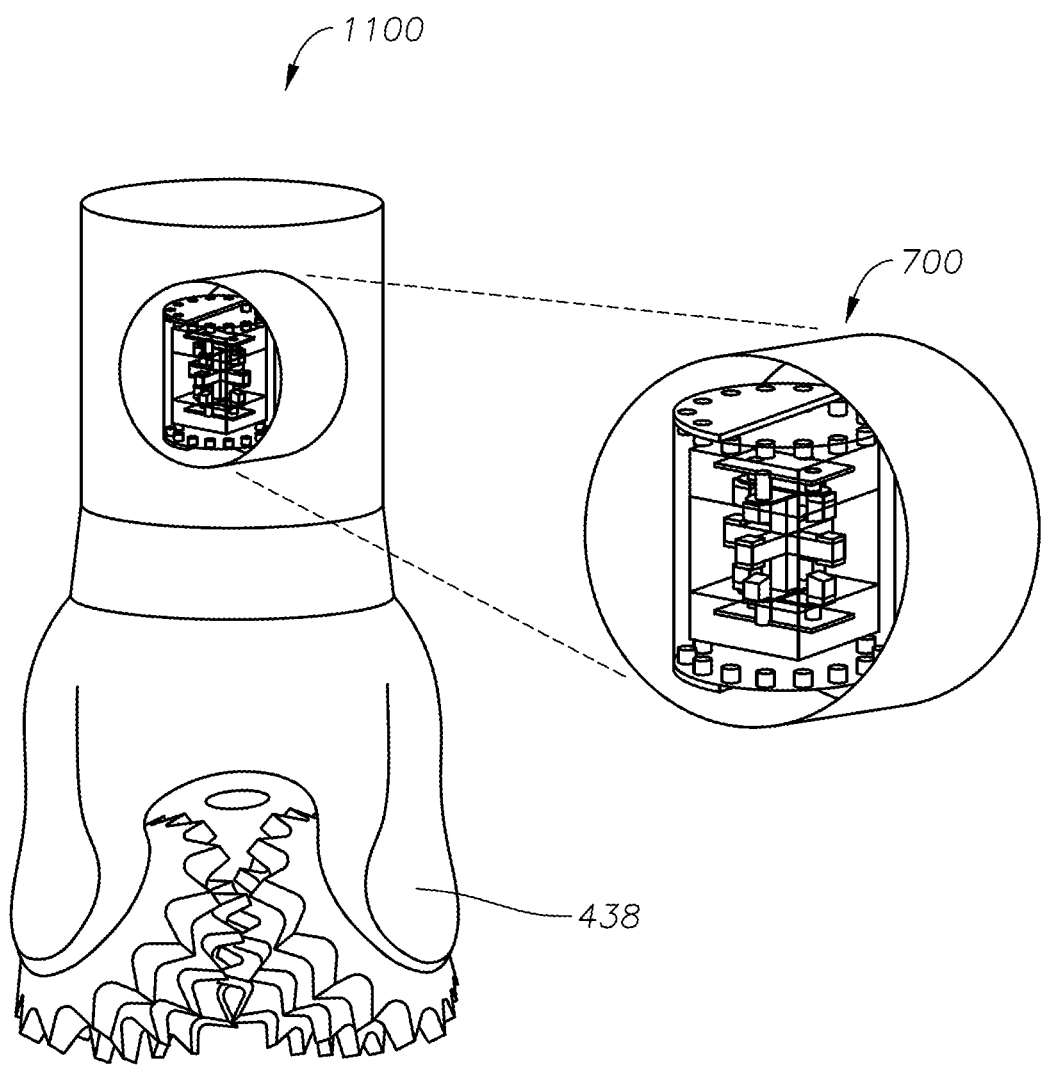
FIG. 11 is a schematic of a system including a high temperature downhole miniature mobile sensing device, comprising a high temperature downhole power generator, sensors, microcontroller/microprocessor and a communications module, which can be embedded inside a drill bit sub, according to one or more example embodiments.

FIG. 11 illustrates a system 1100 including one or more MMSDs 700, according to one or more example embodiments. FIG. 11 shows how the device 700 can be embedded just above a drill bit 438, where the device can easily be taken out once the sub is at the surface. There can be one or several devices placed in this manner. The data in the device can be downloaded at the surface to obtain downhole parameters such as pressure and temperature as well as drilling dynamics information such as torque, vibration, weight on bit, revolutions per minute (RPM), rate of penetration (ROP). The drilling dynamics data can be obtained by sensors in the S&I or by the device itself acting as an active sensor to analyze common drilling problems such as axial/lateral vibrations and stick/slip. The data from the active sensor at the drill bit 438 can transmit data to the surface using the communication channel explained in the above example embodiments.

The MMSDs in FIGS. 4-8 are designed to travel with the drilling fluids, through the drill string to the bottom of the wellbore and then up the annulus to the surface. The power generating mechanism is only triggered by the drilling fluid flow in this case. The MMSD can then be utilized, as shown in FIG. 7A-D, to perform a wide range of functions downhole. The device can obtain downhole parameters such as pressure and temperature while travelling inside the drill string and the wellbore and this data can be downloaded once the device is recovered at the surface. The device can also be in a system where it continues to flow through the surface-drill string-annulus loop, where data can be downloaded wirelessly, at a data acquisition device placed at the surface flow loop. Therefore, the MMSD FIGS. 4-8 can be utilized in a manner similar to those illustrated in FIGS. 1-3.

In some embodiments, multiple devices can be arranged in a ring configuration can be used to measure downhole geological and drilling parameters as well as transmit this data along a communications channel along a drill string in real time. The transceiver employs low power wireless technologies such as low-power Wi-Fi, Bluetooth, Bluetooth Low Energy, ZigBee, etc. Higher frequencies allow a better signal and a longer transmission distance. However, the system may be optimized since attenuation and power requirements are also higher at higher frequencies. The antennas can be directional, omni-directional and point-to-point. The can also be planar antennas such as monopole, dipole, inverted, ring, spiral, meander and patch antennas. In this wireless mode of data telemetry data can be transmitted along the drill string wirelessly, moving along the communication units as in a relay from the bottom to the surface and from the surface to the bottom. The devices can be arranged in a ring configuration or any other configuration and may detect one or more downhole parameters. They can also be placed on drill pipes according to the maximum distance that a signal is able to travel wirelessly. Exploiting the advantage of the device not being dependent on a mud flow to operate, the device and communication channel arrangement can be used to aid pressurized mud cap drilling for example, a variant of managed pressure drilling, to drill ahead in total lost circulation zones. In pressurized mud cap drilling a light annular mud (LAM) is injected below a rotating control device (RCD) to replace the drilling fluid that was in the wellbore at the onset of lost circulation. Then a sacrificial fluid is pumped through the drill string that flows into the fractures. The LAM balances the pore pressure of the formation above the fractured zone while holding a certain surface back pressure. Drilling can then be continued where the sacrificial fluid and the cuttings flow into the fractures. Kicks are monitored by the surface back pressure and the pump pressure. In the event of a kick more LAM is pumped down the annulus. However, one of the main drawbacks of this method is that a kick can only be measured at the surface and if not observed carefully could easily lead to a well blow out. If devices and communication units for example with pressure sensors were placed along the drilling assembly, any change in the pressure in the annulus can immediately be detected at the surface and LAM can be revised and pumped down the annulus before the kick travels up the annulus. Therefore, the device and the communication channel can be a valuable tool when drilling in lost circulation zones.

The device can also be used as a real-time, self-powered active sensor to measure vibration and rotational speed of the drill string. The magnitude and frequency of the impact of the first material on second material will be proportional to the static electricity generated in the lever system. Similarly the frequency of the first material sliding over the second material will be proportional to the static electricity generated. Therefore, the device is not only a power generator but it can also act as both a vibration and rotational speed sensor. In some embodiments, the device can be embedded just above a drill bit, where the device can easily be taken out once the sub is at the surface. There can be one or several devices placed in this manner. The data in the device can be downloaded at the surface to obtain downhole parameters such as pressure and temperature as well as drilling dynamics information such as torque, vibration, weight on bit, revolutions per minute (RPM), rate of penetration (ROP). The drilling dynamics data can be obtained by sensors in the S&I or by the device itself acting as an active sensor to analyze common drilling problems such as axial/lateral vibrations and stick/slip. The main advantages the device presents over MWD and LWD is that they can perform the same/similar functions as MWD and LWD tools but are more compact, flexible, economical when mass produced and do not depend on a battery for providing power to the S&I. The data from the device can also be transmitted by the devices transceiver to a wireless data telemetry unit, such as a mud pulse telemetry system or an acoustic telemetry unit, which is located further above the bit so that the data can be transmitted to the surface in real time. Similarly data can be received by the transceiver of the device from the surface, through a wireless data telemetry unit, for changing the bit direction for example.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A device for wirelessly monitoring well conditions, the device comprising:
   a power generator comprising:
      a first material attached to two edges of at least one lever suspended about a central fulcrum, wherein the two edges of the at least one lever are free to move about the central fulcrum;
      a frictionless movable object disposed inside the body of the at least one lever, wherein the frictionless movable object is free to move, from one edge to another edge, within the body of the at least one lever; and
      a second material that is fixed in position relative to the first material, wherein the first material and second material are of opposite polarities;
   at least one electrode that is connected to the first material or second material;
   a bridge rectifier connected to the at least one electrode to transform the power generated into direct current from alternating current;

a storage unit for storing the power generated by the power generator;
at least one sensor that gathers information concerning a downhole environment; and
a microcontroller and transceiver unit to manage the power generated by the power generator and transmit information gathered by the at least one sensor, wherein the at least one sensor is operatively coupled to the microcontroller.

2. The device of claim 1, further comprising:
a first shell for housing the power generator; and
a second shell for housing the at least one electrode, the bridge rectifier, the storage unit, the at least one sensor, and the microcontroller and transceiver unit,
wherein the first shell and the second shell comprise a material that withstands high temperatures.

3. The device of claim 1, wherein the frictionless movable object comprises at least one of a spherical ball and a liquid.

4. The device of claim 1, wherein the at least one lever comprises a beam or a rod.

5. The device of claim 1, further comprising:
a rotor installed at least one side of the device, wherein the rotor spins about an internal axis of the device such that when the magnitude or direction of the device changes, the angular speed and displacement of the rotor changes;
a plurality of first pads disposed on one side of the rotor, wherein the plurality of pads are coated with the first material; and
a corresponding number of second pads coated with the second material, the second pads being fixed in position relative to the first pads.

6. The device of claim 1, wherein the storage unit comprises one of ceramic film capacitors, electrolytic capacitors, supercapacitors, double-layer capacitors, or pseudo-capacitors.

7. The device of claim 1, wherein the first material and the second material are comprised of a material that causes static electricity.

8. The device of claim 1, wherein the first material and the second material are selected from the group consisting of Copper, Aluminum, Polytetrafluoroethylene (PTFE), Polyimide, Lead, Elastomer, Polydimethylacrylamide (PDMA), Nylon, and Polyester.

9. The device of claim 1, wherein the transceiver unit is configured to communicate over a wireless communication method selected from the group consisting of Wi-Fi, Wi-Fi Direct, Bluetooth, Bluetooth Low Energy, and ZigBee.

10. A system for wirelessly monitoring well conditions, the system comprising:
a plurality of devices wirelessly connected to a computer on a drilling surface, each of the devices comprising:
a power generator comprising:
a first material attached to two edges of at least one lever suspended about a central fulcrum, wherein the two edges of the at least one lever are free to move about the central fulcrum;
a frictionless movable object disposed inside the body of the at least one lever, wherein the frictionless movable object is free to move, from one edge to another edge, within the body of the at least one lever; and
a second material that is fixed in position relative to the first material, wherein the first material and second material are of opposite polarities;
at least one electrode that is connected to the first material or second material;
a bridge rectifier connected to the at least one electrode to transform the power generated into direct current from alternating current;
a storage unit for storing the power generated by the power generator;
at least one sensor that gathers information concerning a downhole environment; and
a microcontroller and transceiver unit to manage the power generated by the power generator and transmit information gathered by the at least one sensor, wherein the at least one sensor is operatively coupled to the microcontroller.

11. The system of claim 10, wherein each of the plurality of devices further comprise:
a first shell for housing the power generator; and
a second shell for housing the at least one electrode, the bridge rectifier, the storage unit, the at least one sensor, and the microcontroller and transceiver unit,
wherein the first shell and the second shell comprise a material that withstands high temperatures.

12. The system of claim 10, wherein each of the plurality of devices further comprise:
a rotor installed at least one side of the device, wherein the rotor spins about an internal axis of the device such that when the magnitude or direction of the device changes, the angular speed and displacement of the rotor changes;
a plurality of first pads disposed on one side of the rotor, wherein the plurality of pads are coated with the first material; and
a corresponding number of second pads coated with the second material, the second pads being fixed in position relative to the first pads.

13. The system of claim 10, further comprising:
a string of wireless transceivers placed along a drill string inside a well, each transceiver placed within at least half the maximum distance that each transceiver can transmit data and configured to communicate wirelessly with the plurality of devices.

14. The system of claim 13, wherein the string of wireless transceivers are configured to:
receive measurement data from one of the devices; and
transmit the measurement data to another wireless transceiver closer to the computer on the drilling surface.

15. The system of claim 10, further comprising:
one or more downhole tools placed along a drill string inside a well for being activated, deactivated, or configured by the device when the device is within a predetermined distance from the tool,
or a downhole tool to activate, deactivate or configure a device when the device is within a predetermined distance from the tool.

16. The system of claim 10, wherein motion in the lever is caused due to vibration, rotation, or mud flow in a drill string carrying the device.

17. The system of claim 10, wherein the storage unit comprises one of ceramic film capacitors, electrolytic capacitors, supercapacitors, double-layer capacitors, or pseudo-capacitors.

18. The system of claim 10, wherein the first material and the second material are comprised of a material that causes static electricity.

19. The system of claim 10, wherein the first material and the second material are selected from the group consisting of Copper, Aluminum, Polytetrafluoroethylene (PTFE), Polyimide, Lead, Elastomer, Polydimethylacrylamide (PDMA), Nylon, and Polyester.

20. The system of claim 10, wherein the transceiver unit is configured to communicate over a wireless communication method selected from the group consisting of Wi-Fi, Wi-Fi Direct, Bluetooth, Bluetooth Low Energy, and ZigBee.

21. The system of claim 10, wherein the plurality of devices are installed on a drilling sub, a drilling pipe, or just above a drill bit of a drilling system.

22. A method for wirelessly monitoring well conditions, the method comprising:
wirelessly connecting a plurality of devices to a computer on a drilling surface, each of the plurality of devices comprising:
a power generator comprising:
a first material attached to two edges of at least one lever suspended about a central fulcrum, wherein the two edges of the at least one lever are free to move about the central fulcrum;
a frictionless movable object disposed inside the body of the at least one lever, wherein the frictionless movable object is free to move, from one edge to another edge, within the body of the at least one lever; and
a second material that is fixed in position relative to the first material, wherein the first material and second material are of opposite polarities;
at least one electrode that is connected to the first material or second material;
a bridge rectifier connected to the at least one electrode to transform the power generated into direct current from alternating current;
a storage unit for storing the power generated by the power generator;
at least one sensor that gathers information concerning a downhole environment; and
a microcontroller and transceiver unit to manage the power generated by the power generator; and
transmitting information gathered by the at least one sensor, wherein the at least one sensor is operatively coupled to the microcontroller.

23. The method of claim 22, further comprising:
providing a first shell for housing the power generator; and
providing a second shell for housing the at least one electrode, the bridge rectifier, the storage unit, the at least one sensor, and the microcontroller and transceiver unit,
wherein the first shell and the second shell comprise a material that withstands high temperatures.

24. The method of claim 22, further comprising:
installing a rotor at least one side of the device, wherein the rotor spins about an internal axis of the device such that when the magnitude or direction of the device changes, the angular speed and displacement of the rotor changes;
providing a plurality of first pads on one side of the rotor, wherein the plurality of pads are coated with the first material; and
providing a corresponding number of second pads coated with the second material, the second pads being fixed in position relative to the first pads.

25. The method of claim 22, further comprising:
installing a string of wireless transceivers along a drill string inside a well, each transceiver being installed within at least half the maximum distance that each transceiver can transmit data, wherein the wireless transceivers are configured to communicate wirelessly with the plurality of devices.

26. The method of claim 22, wherein the string of wireless transceivers are configured to:
receive measurement data from one of the devices; and
transmit the measurement data to another wireless transceiver closer to the computer on the drilling surface.

27. The method of claim 22, further comprising:
installing one or more downhole tools along a drill string inside a well for being activated, deactivated, or configured by the device when the device is within a predetermined distance from the tool,
or a downhole tool to activate, deactivate or configure a device when the device is within a predetermined distance from the tool.

28. The method of claim 22, wherein the storage unit comprises one of ceramic film capacitors, electrolytic capacitors, supercapacitors, double-layer capacitors, or pseudo-capacitors.

29. The method of claim 22, wherein the first material and the second material are selected from the group consisting of Copper, Aluminum, Polytetrafluoroethylene (PTFE), Polyimide, Lead, Elastomer, Polydimethylacrylamide (PDMA), Nylon, Polyester, a fire-resistant material, or a material that causes static electricity.

30. The method of claim 22, wherein the transceiver unit is configured to communicate over a wireless communication method selected from the group consisting of Wi-Fi, Wi-Fi Direct, Bluetooth, Bluetooth Low Energy, and ZigBee.

31. The method of claim 22, wherein the plurality of devices are installed on a drilling sub, a drilling pipe, or just above a drill bit of a drilling system.

* * * * *